Aug. 12, 1941.                M. R. ANSTICE ET AL                2,251,903
                                 MIXING MACHINE
                     Filed Aug. 12, 1939           6 Sheets-Sheet 1

Fig. 1.

INVENTORS
M. R. Anstice
J. D. Clague
By Pattison, Wright & Pattison
ATTORNEYS Patented Aug. 12, 1941

2,251,903

UNITED STATES PATENT OFFICE 2,251,903

MIXING MACHINE

Mortimer R. Anstice, Rochester, and James D. Clague, Livonia, N. Y., assignors to Josiah Anstice & Company, Inc., Rochester, N. Y., a corporation of New York Application August 12, 1939, Serial No. 289,854

7 Claims. (Cl. 259—108)

This invention relates to improvements in mixing machines and particularly to a mixing machine having a variable speed drive and incorporating other novel features of construction the specific nature of which will be pointed out in detail in the following description.

The primary object of the invention is the provision of a new and improved mixing machine having a variable speed drive of novel and improved construction.

A further object of the invention is the provision of a novel and improved bowl support and clamp arrangement therefor for mixing machines.

Another and still further object of the invention is the provision of a novel and improved construction for attaching tools or implements such as beaters, mixers, dough hooks, etc. to the drive shaft of the improved mixing machine.

A still further object of the invention is the provision of an improved beater or whip for use in connection with the mixing machine.

Other novel features of construction of the machine and improved results obtained from the operation thereof will appear in more detail from the following description when read in the light of the accompanying drawings.

The present mixing machine has been primarily conceived and designed for use in hotels, restaurants, hospitals and the like where mixing is done on a large scale, but it is to be recognized that the principle of operation and the construction could be equally as well incorporated into a smaller machine suitable for domestic use.

Figure 1:
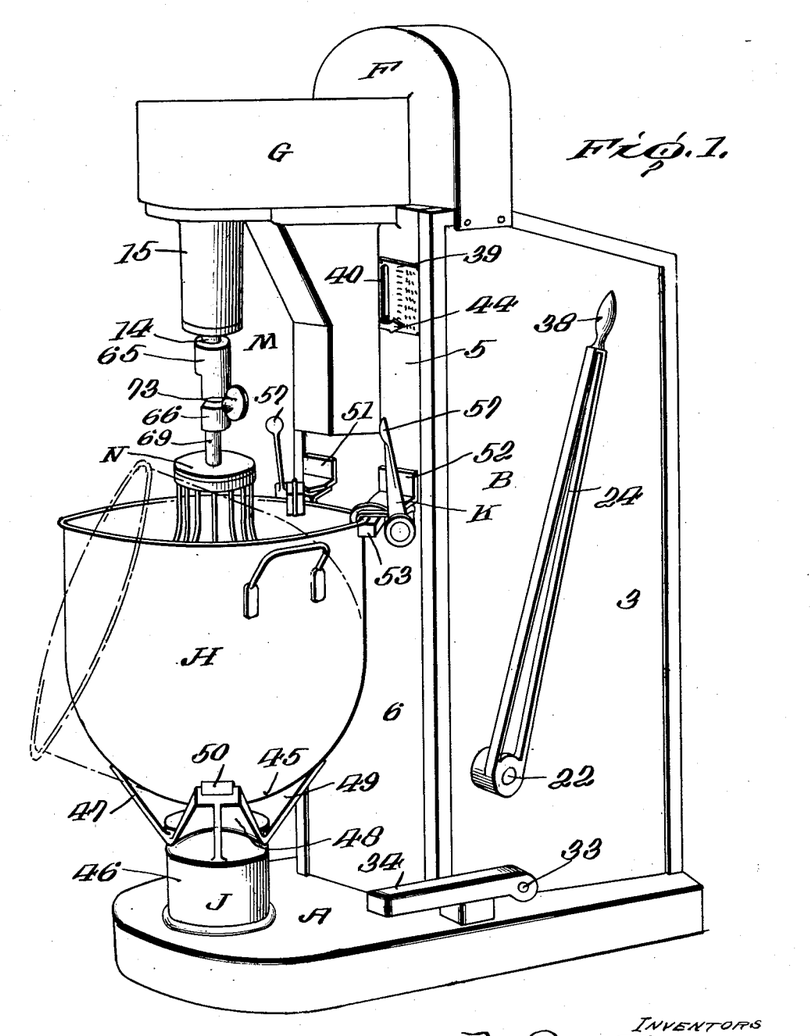
Figure 1 is a perspective view of the mixing machine.

By reference to Figure 1 of the drawings it will be seen that the machine is self-contained and rests upon a base A which in practice will ordinarily rest upon the floor of a kitchen or room in which the mixer is to be used. Were the machine to be used for domestic purposes it would be of smaller size and the base A rather than resting upon the floor would in all probability rest upon a bench, table, or the like.

A housing or pedestal B designated as an entirety rises vertically from the base and comprises four vertical standards or channel irons 1 to which are attached side panels 2 and 3, a rear panel 4 and a front panel which is made up of an upper panel section 5 and a lower quickly and easily removable panel section 6. The pedestal at its bottom is of course closed by the base A upon which it rests while its top is closed by a hinged panel section or cover 7.

For the purposes of providing a machine of pleasing appearance as well as one which can be easily cleaned and maintained in a sanitary condition the panels as well as the base and other parts of the machine are preferably enameled.

The before referred to panels in conjunction with the uprights form a housing which is divided into an upper chamber C and a lower chamber D by a transversely extending division plate 8. An electric motor E is disposed within the upper chamber and suitably secured to a motor platform or plate 9 which platform is movable vertically upwardly and downwardly within the chamber in a manner which will be hereinafter specifically described.

The motor is provided with an outwardly extending shaft carrying a pulley made up of beveled plates or discs 10 and 11. The innermost pulley plate 10 is stationary and rotatable with the shaft while the other plate 11 although rotatable with the shaft is reciprocable thereon and is held normally towards its companion plate 10 by a coil spring 12. A drive belt 13 preferably of the tapered type is trained over the pulley and extends up into a housing F mounted on the upper front end of the pedestal within which it has driving connection with a pulley, not shown, to provide driving power for the shaft 14.

The shaft 14 is vertically disposed and extends downwardly beyond the lower end of a suitable bushing or bearing 15 carried by the under side of a housing G within which are mounted suitable gears and drive mechanism, not shown, for providing driving connection between the shaft 14 and the pulley within the housing F. Inasmuch as this gear drive connection between the shaft 14 and the pulley within the housing F is of any suitable and conventional type and forms no specific part of the present invention no attempt has been made to illustrate it. Those skilled in the art will be thoroughly familiar with the types of drives which would prove suitable in a machine of the present character.

Extending downwardly from the under side of the motor platform through the division plate 8 and a suitable guide sleeve 16 there is a lifting shaft 17 the lower end of which is within the lower chamber D and is provided with a cross pin 18 to which is pivotally connected one end of a link 19 the opposite end of which is suitably and pivotally connected as at 20 to a second link 21 the opposite end of which is rotatable with a shaft 22 mounted in the upper end of a pair of suitable standards 23.

Figure 2:
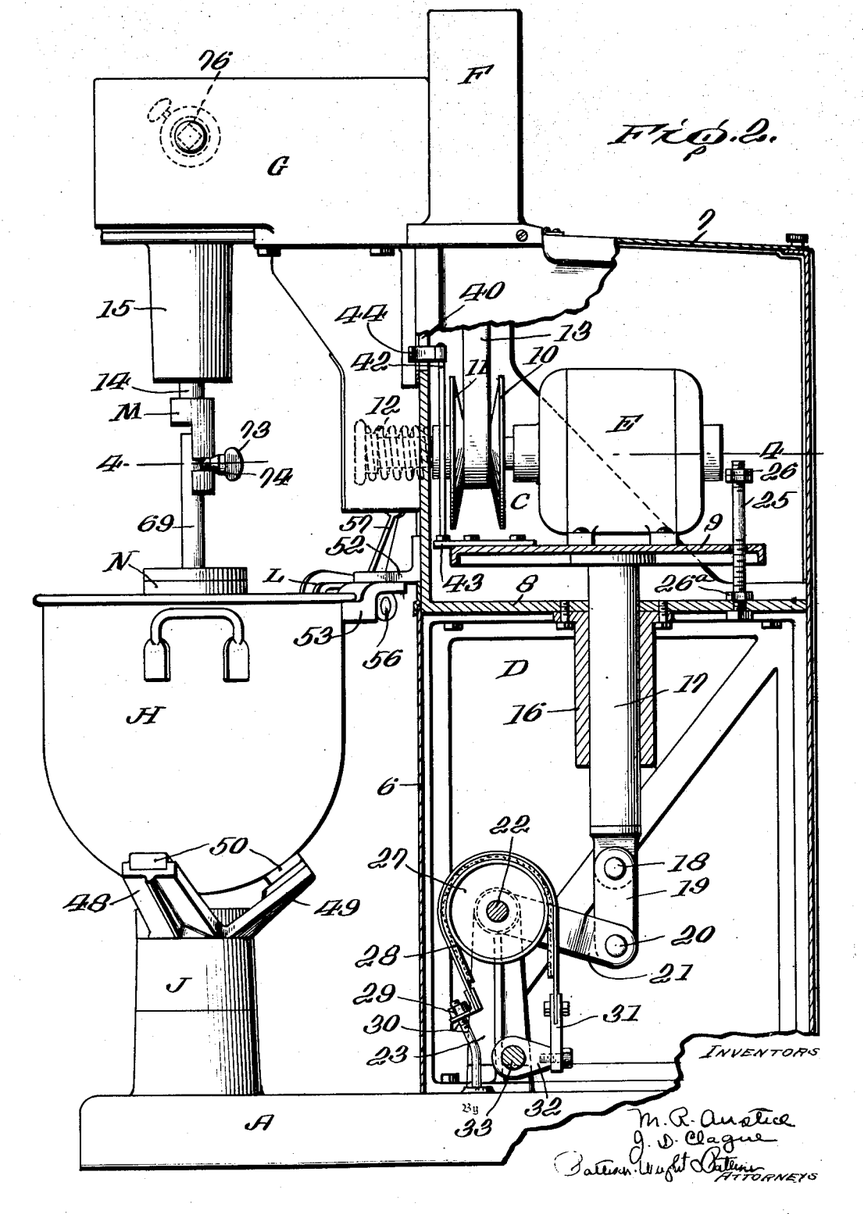
Fig. 2 is a side view of the machine, a portion of the view being broken away and illustrated in vertical section.

The shaft 22 extends outwardly beyond the pedestal side wall panel 3 and on its outer end carries an elongated operating handle 24 by which the operator of the machine may at will rotate the shaft 22 for raising and lowering the motor platform through the drive instrumentalities immediately before described. As an additional guide to the sleeve 16 in the upward and downward movement of the motor platform we provide a guide pin or standard 25 which extends vertically from the division plate 8 as will be clearly seen in Figure 2 of the drawings.

On its upper end this guide pin threadedly carries a pair of nuts 26 which can be adjusted to provide a positive adjustable stop to the upward movement of the motor platform. An adjustable nut 26a adjacent the opposite end of the guide pin serves as an adjustable stop to the downward movement of the motor platform and will prevent the drive belt from being pulled too far into the drive pulley.

A brake is provided for locking the motor platform in any one of the many positions in which it may be adjusted and the description of the brake will now be given. Having particular reference to Figs. 2 and 3 of the drawings in which this brake structure is most clearly illustrated, it will be seen that a brake drum 27 is carried by the shaft 22 and that throughout the greater portion of its circumference the brake drum is encircled and engaged by a brake band 28 one end of which at a point below the brake drum and the shaft 22 is secured as at 29 to an anchor 30 while its other end is provided with a link 31 having attachment with a toggle arm 32 carried by and rotatable with a horizontally disposed shaft 33 which shaft extends outwardly through the side wall or panel 3 and is provided on its outer end with a foot operating treadle 34 normally held in an elevated position by a pair of leaf springs 35 mounted upon a boss 36 which extends upwardly from the main mixer base A.

The action of the leaf springs is such as to impart a downward pull upon the link 31 of the brake band thus normally imparting a braking action upon the brake drum and thereby normally retaining the motor platform in its set position.

When it is desired to move the motor platform upwardly or downwardly the brake is released by foot pressure upon the foot treadle 34.

To raise or lower the motor platform weight or pressure is put upon the foot treadle 34 thus releasing the brake band from the brake drum 27 and the operator of the machine grasps the handle portion 38 of the crank handle 24 and swings the same forwardly or rearwardly to elevate or lower the motor platform by asserting an upward push or downward pull upon the motor platform shaft 17.

It is of course highly desirable and essential for the operator to know the speed at which he is setting the mechanism by manipulation of the motor platform and accordingly a speed indicating plate 39 is positioned in the front panel 5 of the machine and carries thereon the numerous speed indicia. This plate has an elongated opening 40 which registers with a similar opening 41 in the front panel 5. A vertically disposed rod 42 is suitably secured at its lower end to a bracket 43 carried by the upper face of the motor platform 9 and the rod at its upper end is provided with a pointer 44 which travels in the slots 40 and 41 and over the speed indicia of the aforesaid speed indicating plate 39.

Figure 4:
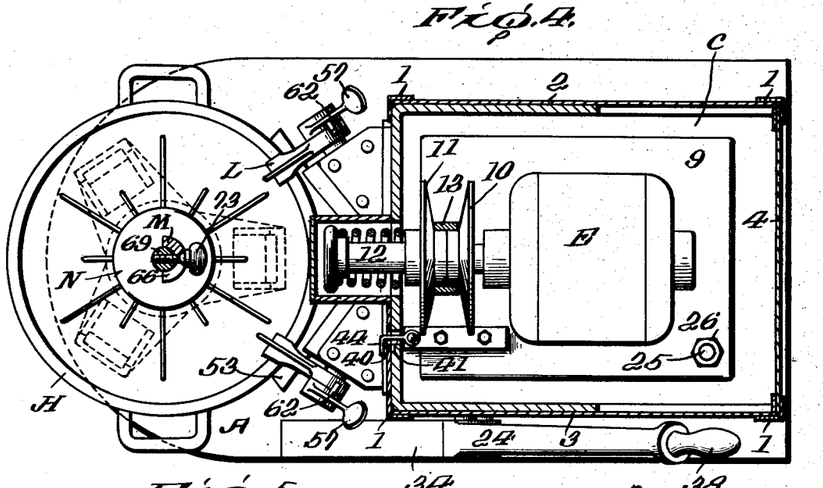
Fig. 4 is a top plan view of the machine a portion of the view being broken away and shown in horizontal section.
Figure 5:
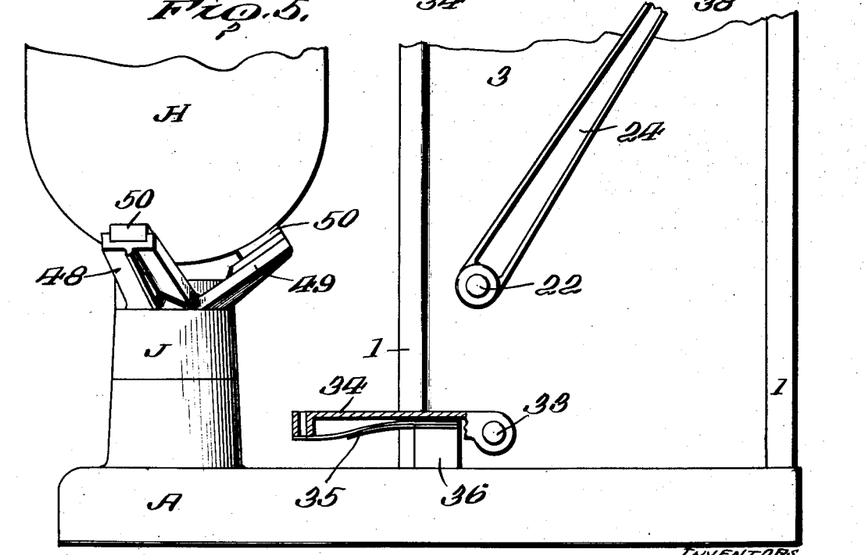
Fig. 5 is a fragmentary detail view of the lower end of the machine, the brake operating treadle being broken away and shown in vertical section.

The variations in speed, it will be understood, is accomplished by raising and lowering the motor platform. As the motor platform is lowered the shaft carrying the pulley faces 10 and 11 is lowered thus causing the drive belt 13 to more deeply enter the pulley and as it more deeply enters the pulley it will cause the reciprocable pulley plate 11 to separate in respect to its cooperative pulley plate 10 as indicated in Fig. 4 of the drawings. When the motor platform is in its lowermost position the mixer is set for its lowest speed. As the motor platform is elevated the shaft carrying the pulley plates is moved upwardly and the drive belt 13 is caused to have its driving connection with the pulley plates at points nearer their outer peripheral edges with the result that with the motor revolving at the same speed a greater speed is imparted to the shaft 14 through the drive belt 13 and its interconnected and interrelated drive elements in the housings F and G.

A variable speed drive or control which in reality provides a close control or setting of the machine at any of a plurality of desired speeds is highly important and essential to an efficient mixing machine.

There is what might be well termed a "critical" speed at which the machine should be operated to obtain the best texture and quality and maximum volume for each formula. No mixer having only three or even four speeds at which it may operate will or can give comparable results to a mixing machine such as the present in which the selection of speed, within reasonable minimums and maximums, is practically without number. Not only is there a "critical" speed for operation upon each formula but this critical speed can and does vary as the beating of whipping operation progresses, and accordingly the present machine provides a single lever control by means of which a wide choice of speeds for each stage of the mixing operation is obtainable and the speed of the machine can be readily and quickly progressively increased or decreased at will through the easy and quick operation of merely stepping upon the brake treadle release 34 and swinging the hand operated lever 24 rearwardly or forwardly in accordance with the proper speed for the particular ingredients being operated upon. The operator has merely to look at the speed indicating plate 39 and he is at once visually advised of the speed at which the machine is operating or can at once visually set the machine to operate at any of almost an endless number of speeds and the desired speed can thus be quickly obtained without stopping in any way the operation of the machine.

It is also highly important that the rotating drive shaft 14 of the mixing machine be absolutely centered in respect to the bowl or container within which is the material being operated upon. This centralization of the shaft and the mixing or beating implements give a much better mixing result.

To this end a novel arrangement of bowl support, centering and locking mechanism is provided. The bowl is designated as an entirety by H and has a rounded or spherical bottom 45. The bowl support is designated as an entirety by J and comprises a pedestal-like member 46 extending upwardly from the front end of the base A and carries on its upper end 3 outwardly and upwardly extending arms 47, 48 and 49 which arms are arranged at an angle or inclination and preferably although not necessarily are provided on their inner faces with a block of rubber, fabric or the like 50.

By reference to Figure 1 of the drawings it will be seen that the bowl can be easily manipulated to the dotted line position so that the contents thereof can be readily removed without lifting the bowl entirely and completely from the machine. This is a desirable and advantageous feature in that the bowl together with its mixture is very heavy and awkward to lift bodily. To enable the ready and rapid tilting of the bowl a novel and quick detachable connection is provided between the mixing machine drive shaft 14 and the particular beating or mixing tool being used. The specific nature of this connection will be hereinafter described.

To assure that the bowl is accurately positioned dead center with the drive shaft 14 the front of the machine is provided with two brackets 51 and 52 having block-like portions 53 and 54 the faces of which are curved, as at 55, on the same radius as the mixing bowl so that the upper rear edge of the mixing bowl will accurately engage these blocks when the mixing bowl is on its pedestal support as will be clearly seen in Figure 1 of the drawings. These brackets and blocks are so arranged that when the mixing bowl is on its pedestal support and firmly in engagement with the block the center axis of the bowl is in vertical alignment with the drive shaft 14 of the mixing machine.

When the machine is in operation it will be understood that there is a tendency for the bowl to rotate or be otherwise moved and to prevent this and to lock the bowl in the described alignment with the drive shaft of the mixing machine we provide a pair of clamps designated as an entirety by K. These clamps are illustrated in detail in Figs. 6 and 7 of the drawings and are preferably supported by the brackets 51 and 52 but in any case are positioned closely adjacent to the bowl engaging blocks 55 of said brackets.

Figure 6:
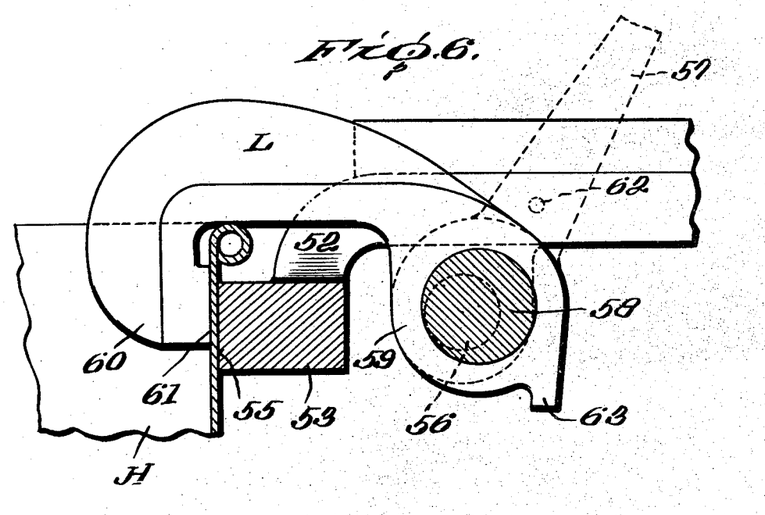
Fig. 6 is an enlarged detail view, partly in vertical section, illustrating the mixing bowl clamp.
Figure 7:
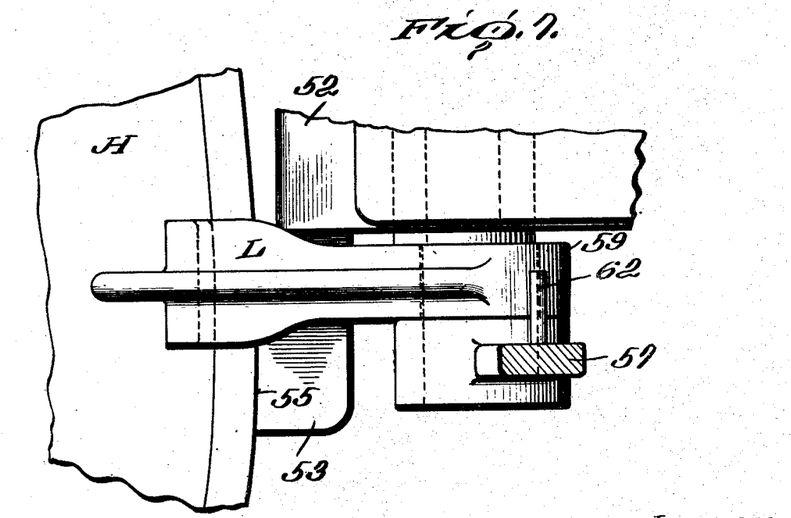
Fig. 7 is a top plan view of the clamp.

By reference to Figs. 6 and 7 of the drawings it will be seen that from each of the brackets there is an outwardly extending shaft 56 and as each of the clamps are of identical construction description of one will suffice to an understanding of them both. On its outer end the shaft 56 is provided with an operating handle 57 suitably keyed or otherwise secured to the shaft so that manipulation of the handle rotates the shaft. Intermediate its length the shaft 56 is provided with an eccentric 58 which freely rotates within a hub portion 59 of a clamp arm L which extends outwardly from the shaft and is provided with a downturned end 60 having a flattened face 61 adapted to clamp the upper side wall of the mixing bowl H against the curved or arc shaped face of the positioning and clamping block 55, as is clearly illustrated in Figs. 6 and 7 of the drawings.

The operating handle 57 is provided with an outwardly extending pin 62 adapted to engage an extension 63 carried by the hub 59 of the clamp arm.

Figures 3, 9:
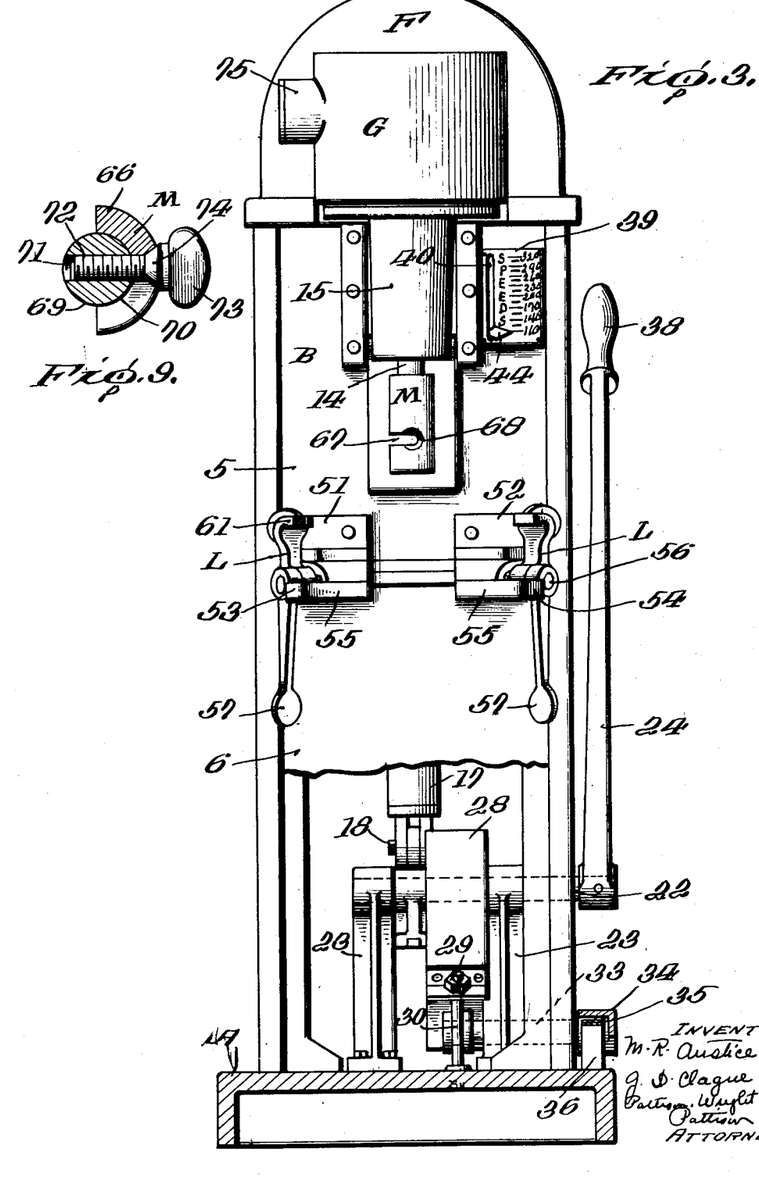
Fig. 3 is a front view of the machine a portion of the view adjacent its bottom being broken away and being shown in vertical section.
Fig. 9 is a horizontal sectional view illustrating the attachment of the mixing tools to the drive shaft.

In operation it will be seen that when the operating arm 57 is swung to the right as viewed in Fig. 6 of the drawings the rotation of the eccentric will cause a releasing of the clamping action of the arm and that when the operating handle has been moved sufficiently far the pin 62 will engage the extension portion 63 of the clamp arm and swing the clamp arm upwardly and rearwardly into the position illustrated in Fig. 3 of the drawings. The weight of the operating handles 57 will maintain the clamp arms in an unclamped position but when the operating handles 57 are manually moved in the opposite direction or to the left in a direction towards the mixing bowl the rotation of the eccentric plus the action of gravitation on the clamp arms will cause them to fall or rotate into a clamping position in respect to the mixing bowl and the clamping faces 55. Further leftward movement of the operating arms 57 will carry them into the positions illustrated in Fig. 1 of the drawings and will cause the mixing bowl to be firmly and securely clamped against the positioning and clamping blocks 55.

From the foregoing description it will be seen that when the mixing bowl is clamped it is automatically positioned and securely held with the center of its bottom in vertical axial alignment with the drive shaft 44. The importance of the foregoing has also been pointed out and the clamps will prevent the normal tendency of the bowl to work around with the heavy mixture which it contains and will also prevent the normal tendency of the bowl to wobble or to leave its bottom supporting arms 49.

The foregoing construction enables the use of a mixing bowl or receptacle having a round bottom. A bowl having this type of bottom has advantages in that it is found that the mixing operation can be better performed in a bowl having such as a bottom, and furthermore that the use of a spatula is more simple in a mixing bowl of this character. Additionally a round bottomed bowl is more easily cleaned and the foregoing description will have made it obvious that the rounded bottom of the bowl enables the bowl to be tipped so that the mass of material therein can be poured or easily ladled out as against the necessity now encountered in mixing machines of lifting the heavy and awkward bowl entirely from the mixing machine and its support. As a matter of fact the bowl and its contents would call for the use of two men to guard against the possibility of a single man straining or otherwise injuring himself by endeavoring to alone lift the mixing bowl and its contents from the machine.

The particular construction which we provide for attaching the mixture working tools to the drive shaft of the machine obviates the necessity or requirement for raising, lowering, or in any way moving the mixing bowl in attaching or detaching working implements to the drive shaft. Obviously raising, lowering or moving the mixing bowl is of no advantage whatever to the mixing operation and when required constitutes an additional operation which requires time and is a nuisance.

Having reference now to Figs. 1, 2, 3 and 9 of the drawings it will be seen that the implement driving shaft 14 is provided with a sleeve-like member designated as an entirety at M. The upper end 65 of this sleeve at and adjacent its attachment to the drive shaft is of solid, and preferably though not necessarily, cylindrical form and has a depending end portion 66 which is of considerable length and is semi-cylindrical in cross sectional shape, as is most clearly apparent in Figs. 4 and 9 of the drawings. Intermediate its length the portion 66 of the sleeve is provided with a transversely extending slot 67 the inner end of which terminates in an opening having its outer end reamed so as to provide a beveled peripheral edge 68.

The particular tool or implement illustrated in the drawings is a whip designated as an entirety by N, but it is of course to be understood that mixing tools or implements of many and various kinds will be utilized in accordance with the particular material or mixture being operated upon in the mixing bowl. However, all of the tools or implements will be provided with a circular shaft 69 the upper end portion of which will have half of its circumferential face disposed within the semi-circular inner face 70 of the sleeve portion 66, as is clearly illustrated in Fig. 9 of the drawings. The tool or implement shaft 69 is provided with a transversely extending interiorly threaded opening 71 which threadedly receives the shank 72 of a thumb nut or screw 73 which extends through the opening at the inner end of the sleeve slot 67. At the under side of its head the thumb screw has a tapered cylindrical portion 74 of the proper size and configuration to fit snugly against the tapered peripheral edge 68 of the sleeve opening.

Thus it will be seen that means is provided to enable mixture working implements to be easily and rapidly applied to and moved from driving connection with the main drive shaft of the mixing machine and that the construction provided is such that the implements will be rigidly secured to the drive shaft. The construction is also such that the application and removal of the working implements can be accomplished without moving the bowl by reason of the fact that the shafts of the implements can be manipulated into and out of engagement with the sleeve M of the machine drive shaft even when the mixing bowl is clamped in its operating position as illustrated in full lines in Figs. 1 and 2 of the drawings.

The housing G at one side is provided with an extending sleeve or bearing 75 within which is disposed a shaft 76 having driving connection with the main drive for the mixer shaft 14. The sleeve or bearing 75 is adapted for the attachment of a meat chopper or grinder or other like power driven kitchen implements.

Figure 8:
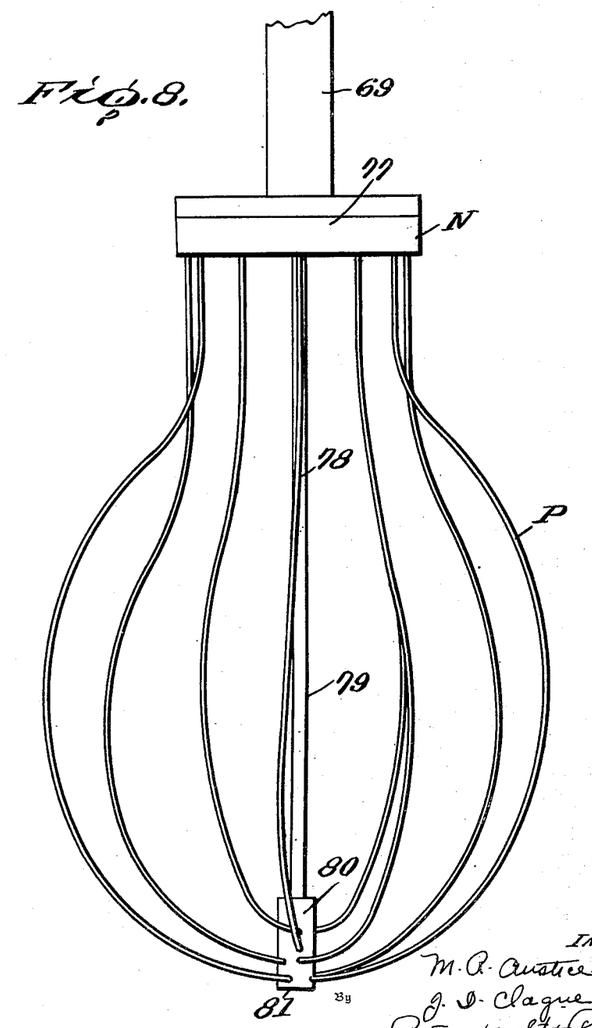
Fig. 8 is a detail view of the whip or beater.

The whip N illustrated in detail in Figure 8 of the drawings is used to whip up egg whites, meringue, whipped cream, mayonnaise or any other of the lighter mixtures which need beating or whipping. In attaching the whip to the drive shaft it should be adjusted so that its bottom will just clear the bottom of the mixing bowl. We have found that one-sixteenth of an inch clearance is a desirable spacing.

Describing the whip in detail it will be seen that a head 77 is carried by the lower end of the main shaft 69 and that a supplemental shaft 78 extends downwardly therefrom and is bowed intermediate its length, as appears at 79, and is provided on its lower end with an enlargement 80. The bow in the shaft 78 places the lower end of the whip to one side of the center of the mixing bowl.

A plurality of whipping wires, each designated as an entirety by P, extend from the head 77 down to and through the enlarged end 80 of the shaft 78 and back to the head 77. It will be seen that each wire is continuous in length and passes through the enlarged end 80 of the shaft 78. The wires do not pass through the end 80 of the shaft through a single hole but an individual hole is provided for each wire and starting from the outermost end 81 of the shaft end 80 these holes are in spaced relationship along the length of the portion 80 of the shaft with the result that the bottoms of the several whip wires will be in graduated spaced relationship to the bottom of the mixing bowl.

The specific construction of the whip has been found to be very advantageous in that when it is being rotated in a mixture within the mixing bowl the lower end of the whip has been found to have an unusual reciprocating motion which is best defined by saying that the bottom of the whip follows a figure 8 path just above the bottom of the mixing bowl. This peculiar reciprocating motion is obtained only when the whip is operating on a mixture which affords a resistance to the whipping wires. This peculiar motion of the whip has been found to be advantageous in that it assures a complete and thorough mixing of all the ingredients of the mixture within the mixing bowl.

As near as we can ascertain the cause for the figure 8 motion of the bottom of the whip is due to the fact that the whip shaft 69 is in direct vertical axial alignment with the bottom of the mixing bowl whereas the bow in the supplemental whip shaft 78 places the lower end of the whip out of alignment with the bottom of the mixing bowl. This arrangement of the parts taken together with the resistance of the mixture to the beater wires when the beater is rotating at high speed within the mixture results in the before-described peculiar whip motion.

From the foregoing it will be seen that the present improved mixing machine embodies numerous advantages and improvements before recited and that the machine can be easily kept in a clean and sanitary condition.

Changes in specific construction can be made in the machine without departing from the spirit of the present invention, the scope of which is to be limited only by the following claims.

We claim:

1. In a food handling machine, an upwardly extending support having a motor mounted thereon provided with a downwardly extending and vertically disposed drive shaft, a food receiving bowl having a rounded bottom, a base provided with upwardly and outwardly extending spaced arms adapted to frictionally engage the under outer side of said bowl and support the same, a pair of spaced members on said motor support adapted to engage the outer side of said bowl above its bottom and in cooperation with said bowl supporting arms position said bowl with the center of its bottom in concentric alignment with said motor drive shaft, quickly operable clamp means for clamping said bowl against said motor support carried bowl positioning members, and the parts operating whereby upon the release of said bowl clamping means said bowl may be rotated on its rounded bottom frictionally over said bowl supporting arms to permit the contents of the bowl to be poured therefrom while the bowl is maintained in supported relationship upon said arms.

2. In a mixing machine, a vertically disposed fixed rotatable implement drive shaft, a mixing bowl having a rounded bottom, a support for said bowl frictionally engaging the outer side of said rounded bowl bottom and permitting the bowl to be frictionally rotated thereover to position the open upper end of said bowl whereby the contents of the bowl can pour outwardly therefrom while the bowl is retained in supported relation upon said support, means engaging said bowl for positioning the center of its rounded bottom in axial alignment with said implement drive shaft, and quickly operable clamps engaging said bowl and locking it against said positioning means and against movement on said bowl support.

3. In a food working machine, a vertically disposed implement drive shaft, a food receiving bowl having a rounded bottom disposed therebeneath, a support frictionally engaging the outer face of said rounded bowl bottom, a food working implement positioned within said bowl and having quick detachable connection with said drive shaft, said connection between said drive shaft and said implement being such that when broken said implement can be moved away from said shaft without movement in a vertical direction, quickly operable clamp means for locking said bowl against movement on said support, and the parts operating whereby upon breaking the connection between said drive shaft and said implement and releasing said bowl clamping means the rounded bottom of the bowl may be rotated over said support to position the open upper end of the bowl in substantially a vertical plane to permit the contents of the bowl to be poured or easily removed therefrom while the mixing bowl is continuously maintained in supporting relationship upon its support.

4. In a food handling machine, a base and a pedestal extending upwardly therefrom, a drive motor provided with a downwardly extending and vertically disposed shaft, an implement provided with a shaft connected in longitudinal axial alignment to said drive shaft and forming a continuation thereof, arms extending upwardly and outwardly in spaced relation from said base and adapted to engage the underside of said bowl and support the same, a pair of bowl engaging members arranged in spaced relation on said pedestal, said bowl supporting arms and said pedestal carried bowl engaging members being so placed as to position the bottom of the bowl in concentric alignment with said motor drive shaft when the bowl is on said supporting arms and in engagement with both of said pedestal carried bowl engaging means, means to clamp the bowl in said position, and said bowl being rotatable on its rounded bottom frictionally over said supporting arms into a position to lie and extend in part between a pair of said arms to permit the contents of said bowl to be poured therefrom while the bowl remains supported on said arms.

5. In a food working machine, a vertically disposed drive shaft, a food receiving bowl having a rounded bottom disposed therebeneath, a plurality of spaced upwardly and outwardly extending arms engaging the underside of said bowl and supporting the same, a food working implement positioned in said bowl and having quick detachable connection with said drive shaft, said connection being such that it can be broken upon movement of the implement directly away from the drive shaft in a direction transverse the longitudinal axis of the drive shaft and without any lifting or lowering movement, means to lock the bowl against movement on its supporting arms, and said bowl upon the releasing of said locking means and the breaking of the drive connection between said implement and drive shaft being rotatable upon its rounded bottom to a position where said bowl in part lies between a pair of said supporting arms and its contents can be poured from its upper end while the bowl is continuously maintained in supporting relationship with said arms.

6. A food handling machine, a base and a pedestal extending upwardly therefrom and provided with a rigid cross arm overhanging said base, a drive motor, a drive shaft therefor vertically disposed and extending downwardly from said cross arm and rigidly secured thereto for axial rotation, an implement provided with a shaft connected in longitudinal axial alignment to said drive shaft and forming a continuation thereof, the connection between said drive shaft and implement shaft being such that it can be quickly broken without any vertical movement of the implement or its shaft, arms extending upwardly and outwardly in spaced relation from said base and adapted to engage the underside of said bowl and support the same, a pair of bowl engaging members arranged in spaced relation on said pedestal, said bowl supporting arms and said pedestal carried bowl engaging members being so placed as to position the bottom of the bowl in concentric alignment with said motor drive shaft when the bowl is on said supporting arms and in engagement with both of said pedestal carried bowl engaging means, means to clamp the bowl in said position, and said bowl being rotatable on its rounded bottom frictionally over said supporting arms into a position to lie and extend in part between a pair of said arms to permit the contents of said bowl to be poured therefrom while the bowl remains supported on said arms.

7. In a mixing machine, an implement drive shaft, an implement comprising a beater connected to said drive shaft for rotation therewith, said beater provided with a shaft constituting a continuation of said drive shaft, one end of said beater shaft being concentrically connected to said drive shaft and its other end being free, said beater shaft being bowed intermediate its length to position its free end out of alignment with said drive shaft, beater wires extending along and enclosing said beater shaft, the inboard ends of said beater wires being operatively connected to said drive shaft for rotation therewith and having portions extending to and being connected with the free end of said beater shaft, for the purpose described.

MORTIMER R. ANSTICE.
JAMES D. CLAGUE.